(12) United States Patent
Mouhouche

(10) Patent No.: US 10,367,626 B2
(45) Date of Patent: Jul. 30, 2019

(54) CHANNEL QUALITY INDICATORS

(71) Applicant: Samsung Electronics Co., Ltd, Gyeonggi-do (KR)

(72) Inventor: Belkacem Mouhouche, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 110 days.

(21) Appl. No.: 15/356,469

(22) Filed: Nov. 18, 2016

(65) Prior Publication Data

US 2017/0149548 A1    May 25, 2017

(30) Foreign Application Priority Data

Nov. 19, 2015   (GB) .................... 1520414.2

(51) Int. Cl.
*H04W 72/08* (2009.01)
*H04L 5/00* (2006.01)
(Continued)

(52) U.S. Cl.
CPC .......... *H04L 5/0057* (2013.01); *H04L 1/0026* (2013.01); *H04L 1/0027* (2013.01);
(Continued)

(58) Field of Classification Search
None
See application file for complete search history.

(56) References Cited

U.S. PATENT DOCUMENTS

2005/0249159 A1   11/2005   Abraham et al.
2006/0160556 A1*   7/2006   Mueller ............. H04L 1/0003
                                                    455/522
(Continued)

FOREIGN PATENT DOCUMENTS

EP   1906569 A1   4/2008
EP   2385643 A1   11/2011
(Continued)

OTHER PUBLICATIONS

"Combined Search and Examination Report under Sections 17 and 18(3)," Application No. GB1520414.2, dated Jun. 22, 2016, 9 pages, publisher Intellectual Property Office, Newport, South Wales.

*Primary Examiner* — Ayaz R Sheikh
*Assistant Examiner* — Sori A Aga

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for selecting one or more data transmission parameters for transmitting data between the base station and one or more devices includes receiving an actual Channel Quality Indicator (CQI) from a device, determining an effective CQI corresponding to the actual CQI based on the actual CQI and the age of the actual CQI, and selecting one or more data transmission parameters based on the effective CQI. A terminal transmits a first CQI value to a base station, receives a request message for requesting an updated first CQI value from the base station, if a second CQI values corresponding to the first CQI value, which is determined based on the first CQI value and time elapsed since the first CQI value is transmitted, is determined that the lowest value of a plurality of CQI value, transmits the updated first CQI value to the base station.

14 Claims, 14 Drawing Sheets

(51) Int. Cl.
*H04L 1/00* (2006.01)
*H04W 88/02* (2009.01)
*H04W 88/08* (2009.01)

(52) U.S. Cl.
CPC ... *H04W 72/085* (2013.01); *H04L 2001/0093* (2013.01); *H04W 88/02* (2013.01); *H04W 88/08* (2013.01)

(56) References Cited

U.S. PATENT DOCUMENTS

| | | | | |
|---|---|---|---|---|
| 2012/0021753 | A1* | 1/2012 | Damnjanovic | H04W 72/082 455/450 |
| 2012/0195226 | A1* | 8/2012 | Liu | H04L 1/0026 370/252 |
| 2016/0105896 | A1* | 4/2016 | Bayesteh | H04J 11/00 370/342 |

FOREIGN PATENT DOCUMENTS

| | | |
|---|---|---|
| WO | 2010120217 A1 | 10/2010 |
| WO | 2011000420 A1 | 1/2011 |
| WO | 2011093753 A1 | 8/2011 |

\* cited by examiner

FIG. 2

| Device ID | Device Category | Most recent actual CQI value | Time of most recent actual CQI value | Age of most recent actual CQI value | Actual CQI category | Actual CQI history | Actual CQI history average | Effective CQI value |
|---|---|---|---|---|---|---|---|---|
| Device_0 | Stationary | 20 dB | 15.11.13 07:25:00 | 1 day | Obsolete | 18, 17, 21, 20 | 19 dB | -∞ |
| Device_1 | Stationary | 15 dB | 14.11.13 18:25:00 | 11 hours | Out of date 3 | 15, 12, 16, 16 | 14 dB | 11 dB |
| Device_2 | Limited Mobility | 13 dB | 14.11.13 11:25:00 | 4 hours | Obsolete | 15, 12, 16, 16 | 14 dB | -∞ |
| Device_3 | Limited Mobility | 11 dB | 14.11.13 09:25:00 | 2 hours | Out of date 1 | 9, 12, 10, 11 | 11 dB | 10 dB |
| Device_4 | Mobile | 14 dB | 14.11.13 07:35:00 | 10 minutes | Out of date 1 | 15, 12, 15, 15 | 13 dB | 13 dB |
| Device_5 | Mobile | 17 dB | 14.11.13 07:30:00 | 5 minutes | Recent | 15, 12, 16, 19 | 15 dB | 17 dB |

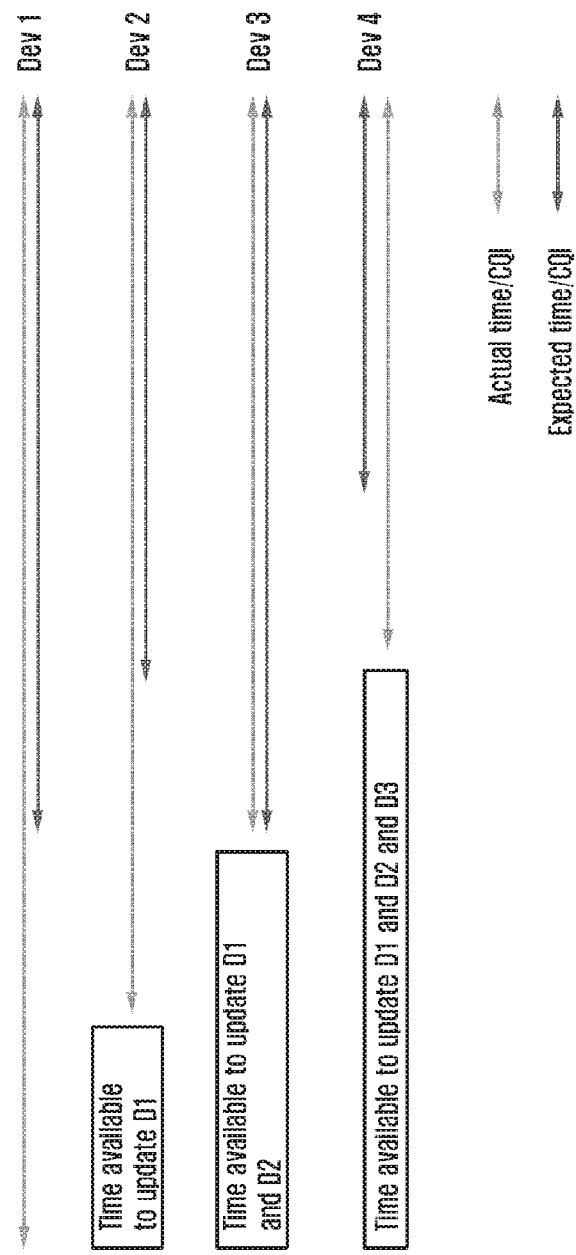

CHANNEL QUALITY INDICATORS

CROSS-REFERENCE TO RELATED APPLICATION AND CLAIM OF PRIORITY

The present application is related to and claims the benefit under 35 U.S.C. § 119(a) of an United Kingdom patent application filed on Nov. 19, 2015 in the Intellectual Property Office of the United Kingdom and assigned Serial number 1520414.2, the entire disclosure of which is hereby incorporated by reference.

TECHNICAL FIELD

Certain embodiments of the present disclosure provide a technique for selecting data transmission/reception parameters based on Channel Quality Indicators (CQIs) of devices in a network, and a technique for selectively updating the CQIs. For example, certain exemplary embodiments provide methods and apparatuses for selecting a downlink multicast data transmission rate based on downlink CQIs of devices in a Cellular Internet of Things (CIoT), and methods and apparatuses for allowing a base station to selectively request one or more of the devices to provide updated CQIs.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

One type of wireless network topology comprises one or more wireless transceivers, known as base stations, where each base station provides network coverage over a certain geographic area, known as a cell. A device located within a certain cell may connect to the network by connecting to a corresponding base station through a wireless link. When a device connected to the network moves within a cell, the device typically remains connected to the corresponding base station. On the other hand, when a device connected to the network moves from a first cell to a second cell, a handover process is performed, wherein the device disconnects from the base station of the first cell and connects to the base station of the second cell.

In a network topology of the type described above, each device connected to the network typically transmits a Channel Quality Indicator (CQI) to the base station to which each device is currently connected. The CQI of a device provides an indication of the quality of the channel between that device and the base station, and may be used, for example, to determine or select the most appropriate or optimal transmission parameters (e.g. data rate and modulation and coding scheme) for downlink data transmissions from the base station to the device. Since channel conditions may vary over time, a device typically transmits updated CQIs repeatedly to the base station so that the base station can maintain reliable or up-to-date CQIs. For example, updated CQIs may be transmitted periodically, according to a certain schedule, or in response to a request from the base station.

A wireless network topology of the type described above has been applied to mobile telecommunications for more than twenty years. More recently, the concept of an Internet of Things (IoT) has been developed. An IoT is envisioned as a network to which a very large number of devices, including a very wide variety of devices, may be connected. In particular, the concept of an IoT extends network connectivity to many types of devices that traditionally have not been connected to a network, for example home appliances (e.g. fridges, vacuum cleaners, televisions) and utility meters (e.g. gas, water and electricity meters). An IoT has many potential applications, including allowing connected devices to collect and exchange data, and allowing connected devices to be remotely controlled and monitored, for example. It is anticipated that an IoT may be implemented, at least partially, using a wireless cellular network (forming a Cellular IoT, or CIoT), and the technical requirements of a CIoT implementation are being considered in the development of the next generation mobile telecommunications standard, 5G.

A document titled 3GPP TR 45.820 V2.1.0 describes the outcomes of a 3GPP study item on "Cellular System Support for Ultra Low Complexity and Low Throughput Internet of Things". This document mentions that "To support the so called 'Internet of Things' (IoT), 3GPP operators have to address usage scenarios with devices that are power efficient (with battery life of several years), can be reached in challenging coverage conditions e.g. indoor and basements and, more importantly, are cheap enough so that they can be deployed on a mass scale and even be disposable."

Many devices connected to a CIoT may have very strict battery life requirements. For example, some devices may require a battery life of up to 10 years. Consequently, such devices are required to operate with long periods of discontinuous reception (DRX) and discontinuous transmission (DTX) to save power and extend battery life. Consequently, such devices may only transmit updated CQIs relatively infrequently.

In this case, one problem that can arise is that, due to long periods between CQI updates, a most recent CQI may become unreliable or out-of-date, before an updated (and hence more reliable) CQI is provided. This problem is particularly acute in situations where channel conditions may vary significantly over time, for example for mobile devices, or stationary devices located in varying environments. Selecting transmission parameters based on unreliable or out-of-date CQIs can lead to poor transmission performance, or even transmission failure, due to the selection of sub-optimal transmission parameters based on out-of-date CQIs.

In some situations, it is necessary for a base station to transmit data for reception by multiple devices simultaneously (i.e. a multicast transmission), for example to distribute a software update or patch to multiple devices at once. In this case, as the number of devices increases, the probability of at least one device having an out-of-date CQI, and hence the probability of transmission failure to at least some of the devices, increases.

In view of the above, what is desired is a technique for selecting appropriate data transmission/reception parameters based on CQIs of devices in a network, and a technique for updating the CQIs, to improve transmission/reception performance, while adhering to the battery life requirements of the devices.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object It is an aim of certain exemplary embodiments of the present disclosure to address, solve and/or mitigate, at least partly, at least one of the problems and/or disadvantages associated with the related art, for example at least one of the problems and/or disadvantages described above. It is an aim of certain exemplary embodiments of the present disclosure to provide at least one advantage over the related art, for example at least one of the advantages described below.

The present disclosure is defined in the independent claims. Advantageous features are defined in the dependent claims.

In accordance with an aspect of the present disclosure, there is provided a method, for a base station, for selecting one or more data transmission parameters for transmitting data between the base station and one or more devices, the method comprising receiving an actual Channel Quality Indicator (CQI) from a device, determining an effective CQI corresponding to the actual CQI based on the actual CQI and the age of the actual CQI, and selecting one or more data transmission parameters based on the effective CQI.

In accordance with an aspect of the present disclosure there is provided a computer program comprising instructions arranged, when executed, to implement a method, device, apparatus and/or system in accordance with any aspect, claim, embodiment or example disclosed herein. In accordance with another aspect of the present disclosure, there is provided a machine-readable storage storing such a program.

Other aspects, advantages, and salient features of the disclosure will become apparent to those skilled in the art from the following detailed description, which, taken in conjunction with the annexed drawings, disclose exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates a data structure used in embodiments of the present disclosure;

FIGS. 9 to 11 schematically illustrate the maximum number of devices that can be updated, the time available to update the devices, and the expected time to update the devices in certain exemplary embodiments of the present disclosure.

DETAILED DESCRIPTION

Figure 1A:
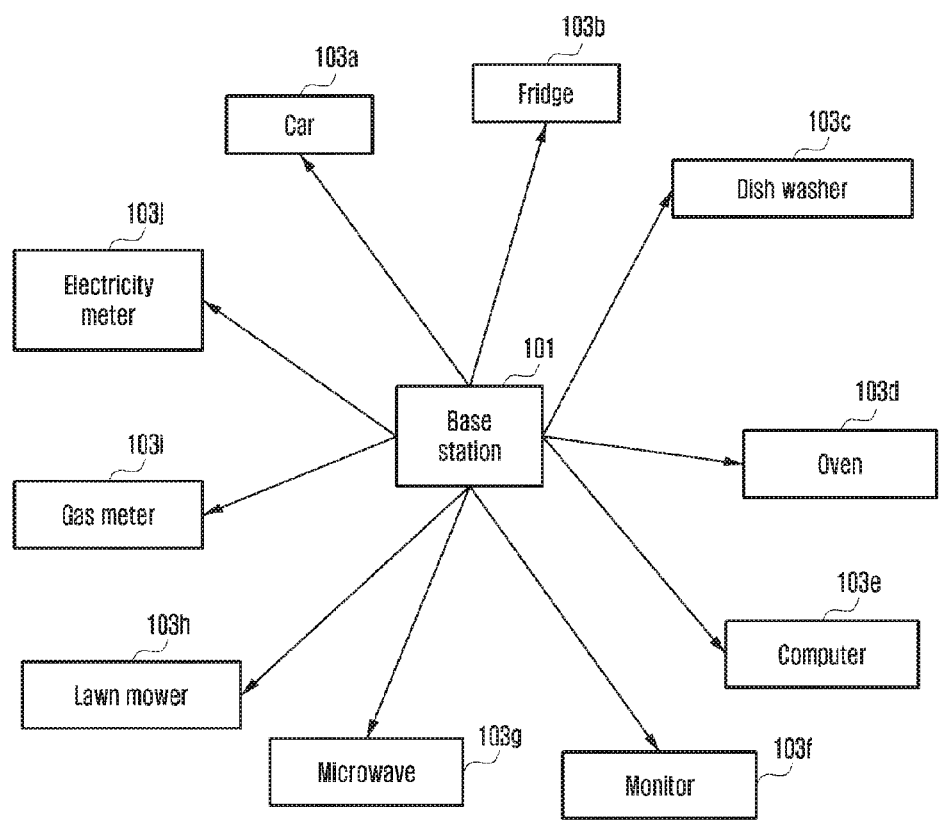
FIG. 1A illustrates a network embodying the present disclosure, comprising a base station and one or more devices connected to the base station.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication devices.

The following description of exemplary embodiments of the present disclosure, with reference to the accompanying drawings, is provided to assist in a comprehensive understanding of the present disclosure, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the disclosure.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the disclosure.

Throughout the description and claims of this specification, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim disclosed herein are to be understood to be applicable to any other aspect, embodiment, example or claim described herein unless incompatible therewith.

The techniques described herein may be implemented using any suitably configured apparatus and/or system. Such an apparatus and/or system may be configured to perform a method according to any aspect, embodiment, example or claim disclosed herein.

Certain exemplary embodiments of the present disclosure will now be described. These embodiments are described with reference to a Cellular Internet of Things (CIoT). However, the skilled person will appreciate that the present disclosure is not limited to a CIoT. For example, the present disclosure may be applied to any type of network in which CQIs are used. For example, the present disclosure is not limited to a wireless network, and may be applied to a wired network or to a network comprising both wired and wireless parts. Furthermore, the present disclosure is not limited to a cellular network, and may be applied to other network topologies, for example Point-to-Point networks. In addition, the skilled person will appreciate that the term CQI used herein encompasses any suitable parameter(s) for indicating channel quality.

Since channel conditions between a device and a base station may vary over time, a CQI value provided at one point in time may not provide a totally reliable indication of channel conditions at a later point in time. In particular, it may be assumed that the reliability of a CQI value generally decreases over time. In the following description, the reliability of a CQI value refers to how reliable the CQI value is in providing an indication of current channel conditions. For example, in certain exemplary embodiments, the reliability of a CQI value may be defined in terms of the probability that the difference (or ratio, or other suitable function providing a comparative relationship) between the CQI value and the true current channel quality is less than a certain threshold amount. The skilled person will appreciate that any other suitable definition of CQI reliability may be used.

As will be described in greater detail below, in embodiments of the present disclosure, an "effective CQI value" of a device may be determined as a function of an "actual CQI value" of the device and the time elapsed since the actual CQI value was provided, generated, measured or obtained (i.e. the "age" of the actual CQI value). The function characterizes how the reliability of the actual CQI value reduces over time. In certain embodiments, the function may be dependent on the type or category of device, such that the function characterizes how the reliability of actual CQI values of devices of a particular type reduce over time. For example, in certain embodiments described below, the function is a step function defined such that an effective CQI value reduces in steps over time. Thus, an effective CQI value may be thought of as a CQI value that factors in the reduction in reliability of an actual CQI value over time. In the following description, an actual CQI value refers to an actual CQI value measured, generated, provided or obtained by a device that does not factor in any reduction in reliability. Accordingly, an actual CQI value remains constant, in contrast to the corresponding effective CQI value, which decreases over time.

As will also be described in greater detail below, in embodiments of the present disclosure, one or more data transmission/reception parameters for performing data transmission/reception between a base station and one or more devices may be selected or determined based on the effective CQI values of the devices, rather than the actual CQI values. For example, in the case of a downlink multicast transmission, a data transmission rate may be selected based on the lowest effective CQI value among all devices intended to receive the multicast transmission (i.e. recipient devices). Since effective CQI values are used to select the data transmission/reception parameters, the reliability of actual CQI values are taken into account in the choice of data transmission/reception parameters, thereby improving transmission/reception performance.

The skilled person will appreciate that the present disclosure is not limited to selection of transmission/reception parameters for downlink multicast transmission. For example, transmission/reception parameters may be selected according to the techniques described herein for uplink and/or downlink paths, and for any suitable type of routing or addressing scheme (e.g. point-to-point, unicast, multicast, broadcast, anycast, geocast).

As will also be described in greater detail below, in certain exemplary embodiments, to reduce the overall time required to complete the data transmission, the base station may determine whether to request one or more selected devices to provide updated actual CQI values. The purpose of requesting one or more devices to provide updated actual CQI values is to obtain more reliable actual CQI values, with the expectation that this will result in higher effective CQI values, and hence allow a higher data transmission rate to be selected. The determination of whether to make a request, and the selection of devices to request, may be made based on whether or not a potential reduction in time required to perform the data transmission, due to an increased data transmission rate resulting from the updating of actual CQI values of certain devices, is greater than the time overhead required to update the actual CQI values.

As will also be described in greater detail below, in certain exemplary embodiments, to reduce the overall time required to complete the data transmission, the base station may determine whether one or more selected devices should be excluded from a multicast transmission, and should instead be dealt with individually, for example on a point-to-point basis. For example, in certain embodiments, one or more devices having the lowest effective CQI values may be excluded from the multicast transmission, hence allowing a higher data transmission rate to be selected for the remaining devices. The determination of whether to exclude one or more devices may be made based on whether or not a potential reduction in time required to perform the multicast data transmission (due to an increased data transmission rate) resulting from the exclusion of certain devices is greater than the time overhead required to separately perform the data transmission to the excluded devices. In certain embodiments, if one or more devices having the lowest effective CQI values do not require the data transmission urgently (e.g. within a certain threshold time), then these devices may be excluded from the multicast data transmission, regardless of whether or not this will reduce the overall time required to complete the data transmission to all devices.

Figure 1B:
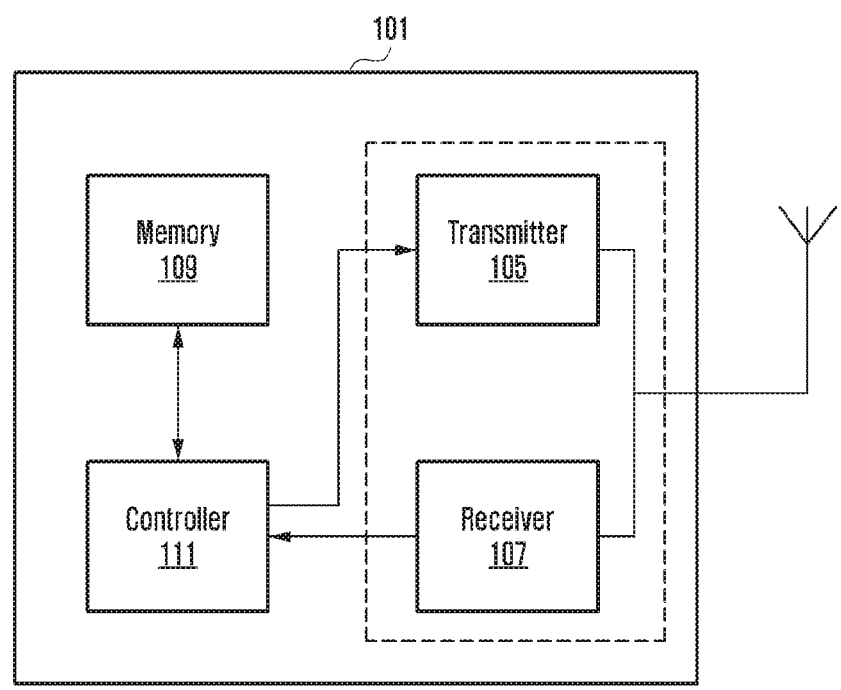
FIG. 1B illustrates the base station shown in FIG. 1A in greater detail.

FIG. 1A illustrates an exemplary embodiment of the present disclosure, including a network 100 comprising a base station (or access point) 101, and one or more devices 103 connected to the base station 101. FIG. 1B illustrates the base station 101 shown in FIG. 1A in greater detail, and FIG. 1C illustrates a device 103 shown in FIG. 1A in greater detail.

As illustrated in FIG. 1b, the base station 101 comprises a transmitter 105 and receiver 107 (for example in the form of a transceiver), a memory 109, and a controller 111 (or processor). The transmitter 105 is configured for transmitting various signals to one or more of the devices 103, including transmission data (e.g. a software update), and request signals for requesting one or more devices 103 to provide an updated actual CQI value. The receiver 107 is configured for receiving various signals from one or more of the devices 103, including messages containing an identification (ID) of each device 103, messages indicating a category of each device 103, and actual CQI values. The memory 109 is configured for storing various items of information used during operation, including a data structure 200 described in greater detail below. The controller 111 is configured for controlling overall operation of the base station 101, and for performing various operations in relation to the methods described in greater detail below. For example, the controller 111 is configured for determining an effective CQI corresponding to a received actual CQI based on the actual CQI and the age of the actual CQI, and for selecting one or more data transmission parameters based on the effective CQI.

Figure 1C:
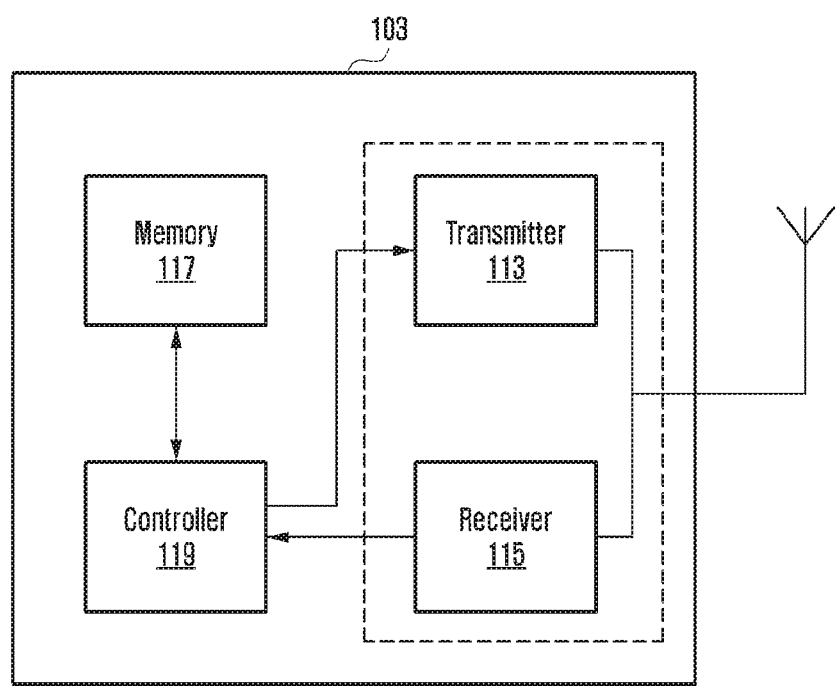
FIG. 1C illustrates a device shown in FIG. 1A in greater detail.

As illustrated in FIG. 1C, the device 103 comprises a transmitter 113 and receiver 115 (for example in the form of a transceiver), a memory 117, and a controller 119. The transmitter 113 is configured for transmitting various signals to the base station 101, including a message containing an ID of the device 103, a message indicating a category of the device 103, and actual CQI values. The receiver 115 is configured for receiving various signals from the base station 101, including transmission data (e.g. a software update), and request signals for requesting the device 103 to provide an updated actual CQI value. The memory 117 is configured for storing various items of information used during operation. The controller 119 is configured for controlling overall operation of the device 103, and for performing various operations in relation to the methods described in greater detail below. For example, the controller 119 is configured for obtaining an actual CQI value and for controlling the transmitter 113 to transmit the obtained actual CQI value to the base station 101. The device 103 may be configured to transmit an actual CQI value to the base station 101 periodically, and/or according to a certain schedule, and/or in response to a request signal received from the base station 101.

Each device 103 is assigned to one of a number of predefined categories. For example, a device 103 may be assigned to a category based on how the reliability of an actual CQI value of that device 103 decreases over time. For example, a device 103 whose actual CQI values decrease in reliability relatively quickly (e.g. due to motion of the device 103, or due to the device 103 being located in a relatively variable environment) may be assigned to a different category than a device 103 whose actual CQI values decrease in reliability relatively slowly (e.g. due to the device 103 being in a fixed position, or due to the device 103 being located in a relatively stable environment). The device categories may be defined based on any suitable factors, for example one or more properties and/or characteristics of a device, the environment in which a device is typically used, the typical behavior of a device, typical movement patterns of a device, and/or typical use scenarios of a device.

In the embodiments described below, three categories of device 103 are defined: (i) stationary; (ii) limited mobility; and (iii) mobile. A stationary device is one that remains in a fixed position for a relatively long period of time (e.g. a fridge or other household appliance). A mobile device is one that may move position (e.g. a device fitted in a vehicle or worn by a user). A limited mobility device is one that may move position, but such that the movement is typically confined or constrained to a certain region or area (e.g. a vacuum cleaner or lawn mower that is used only within a home or garden). The skilled person will appreciate that different categories, and different numbers of categories, may be defined in other embodiments.

The category of a device 103 may be stored in a memory of the device 103 (e.g. as part of the class mark of the device), and each device 103 may transmit a message to the base station 101 (e.g. during an initial connection process) containing an indication of its category.

Each device 103 connected to the base station 101 transmits actual CQI values to the base station 101. An actual CQI value of a device 103 provides the base station 101 with an indication of the channel conditions between the base station 101 and that device 103 at the time the actual CQI value was measured, generated, obtained or provided. The actual CQI values may include an initial actual CQI value and one or more subsequent (updated) actual CQI values. An actual CQI value of a device 103 may be determined based on any suitable measure or indicator of channel quality, for example one or more of: a noise level; an interference level; a Signal-to-Noise Ratio (SNR); and a Signal-to-Interference plus Noise Ratio (SINR). The timing of actual CQI transmissions may be determined according to any suitable scheme. For example, the times at which a device 103 transmits a CQI value may be based on one or more factors, for example the category of the device 103, the location of the device 103, and/or changes in location of the device 103.

For example, since stationary devices remain in a fixed position, actual CQI values provided by stationary devices may be regarded as remaining reliable for a relatively long period of time. Accordingly, stationary devices may transmit actual CQI values relatively infrequently (e.g. periodically with a relatively large period). On the other hand, since mobile devices change position (potentially between positions having significantly different channel conditions), actual CQI values provided by mobile devices may be regarded as decreasing in reliability relatively quickly. Accordingly, mobile devices may transmit actual CQI values relatively frequently (e.g. periodically with a relatively short period). Since movement of limited mobility devices is limited to a certain area, changes in channel conditions resulting from changes in position are likely to be less pronounced for limited mobility devices than for mobile devices. Accordingly, limited mobility devices may transmit actual CQI values with a frequency less than that of mobile devices (but higher than that of stationary devices).

In addition, limited mobility devices and mobile devices may transmit an actual CQI value when the position of the device changes, for example (i) when the device moves (e.g. within a cell) such that the device is located more than a threshold distance from the location of the device 103 when the previous CQI value was transmitted, and/or (ii) when the device 103 moves from one cell to another.

As mentioned above, an effective CQI value of a device 103 may be determined as a function of an actual CQI value of that device 103 and the time elapsed since the actual CQI value was measured, obtained, generated or provided (i.e. the "age" of the actual CQI value). The function may also be dependent on the category of the device 103.

The age of an actual CQI value may be measured with respect to any suitable initial time point. For example, in certain embodiments, the initial time point may be the time at which a device 103 measured, obtained or generated the actual CQI value, the time at which the actual CQI is transmitted by the device 103, or the time at which the base station 101 receives the actual CQI value. For example, in the exemplary embodiment described below, the age of an actual CQI value is measured with respect to the time at which the actual CQI was transmitted by a device 103. In certain exemplary embodiments, each actual CQI value may include a time stamp that indicates the initial time point. The time stamp may be generated by the device 103 and transmitted together with the actual CQI value, or may be generated by the base station 101 upon receipt of the actual CQI value, depending on the definition of the initial time point used.

One example of deriving an effective CQI value from an actual CQI value according to a step function will now be described. A step function may be informally described as a piecewise constant function.

First, an actual CQI value of a device 103 is categorized according to how long ago the CQI was transmitted by the device 103 (i.e. the "age" of the actual CQI). For example, an actual CQI value transmitted at time t may be placed in an nth CQI category (n=1, 2, . . . , N) if $T_n \leq t_0 - t < T_{n+1}$, where $t_0$ is the current time, and $T_k$ (k=1, 2, 3, . . . , N+1) are N+1 thresholds defining N age ranges, where $T_j < T_{j+1}$ (j=1, 2, . . . , N). In some embodiments, $T_1 = 0$ and $T_{N+1} = \infty$.

In some embodiments, the thresholds $T_k$ and/or the number of CQI categories N may be dependent on the category of the device 103 that transmitted the actual CQI value. Alternatively, the thresholds and the number of CQI categories may be the same for all categories of device 103.

The first CQI category (n=1) may be referred to as "Recent", the Nth CQI category (n=N) may be referred to as "Obsolete", and the remaining categories may be referred to as "Out of date 1" (n=2), "Out of date 2" (n=3), "Out of date 3" (n=4), etc. An actual CQI value in category "Recent" may be regarded as being as reliable as the actual CQI value was at the time it was transmitted. An actual CQI value in category "Obsolete" may be regarded as being too unreliable for use, such that an updated actual CQI value is required. An actual CQI value in one of the "Out of date" categories may be regarded as being less reliable than the actual CQI value was at the time it was provided, but sufficiently reliable for use (with an adjustment, as described below).

Each CQI category is associated with a corresponding CQI adjustment value (or penalty value), such that the nth CQI category is associated with a CQI adjustment value $A_n$. In some embodiments, the adjustment values $A_n$ may be dependent on the category of the device 103 that transmitted the actual CQI value. Alternatively, adjustment values may be the same for all categories of device 103. An effective CQI value may be derived from an actual CQI value and the CQI adjustment value corresponding to the CQI category in which the actual CQI value is placed. For example, in one embodiment, actual CQI values are measured in dB, the CQI adjustment values are given by $A_k = (k-1)P$ dB for k=1, 2, . . . , N-1, and $A_N = \infty$ dB, wherein P is a constant adjustment value, and an effective CQI value is determined by subtracting the CQI adjustment value from the actual CQI value, specifically $CQI_{effective} = CQI_{actual} - A_k = CQI_{actual} - (k-1) \cdot P$.

According to the above scheme, an actual CQI value is re-categorized (e.g. Recent → Out of date 1 → Out of date 2 → . . . → Obsolete) as it gets older, and hence the corresponding effective CQI value decreases in steps over time. For example, in the case of N=5 and an actual CQI value of X, the effective CQI values may be given by the following table, where $a = t_0 - t$ is the age of the actual CQI value.

TABLE 1

| | Age of actual CQI | | | | |
|---|---|---|---|---|---|
| | $0 \leq a < T_2$ | $T_2 \leq a < T_3$ | $T_3 \leq a < T_4$ | $T_4 \leq a < T_5$ | $a > T_5$ |
| CQI category | Recent | Out of date 1 | Out of date 2 | Out of date 3 | Obsolete |
| Adjustment | 0 | P dB | 2P dB | 3P dB | ∞ |
| Effective CQI | X dB | (X − P) dB | (X − 2P) dB | (X − 3P) dB | −∞ dB |

In embodiments in which the function for deriving an effective CQI value from an actual CQI value is dependent on the category of the device 103, a table similar to Table 1 above may be defined for each category of device. In this case, the rate at which the effective CQI value decreases over time may depend on the device category.

In the above example, an effective CQI value is derived from on an actual CQI based on a step function involving categorizing the actual CQI value and applying an adjustment value according to a table. However, the skilled person will appreciate that the present disclosure is not limited to this specific example. For example, in embodiments of the present disclosure, an effective CQI value $CQI_{effective}$ may be derived from an actual CQI value $CQI_{actual}$ and the age of the actual CQI value, a, based on any suitable function $f$ such that $CQI_{effective}=f(CQI_{actual}, a)$. The function $f$ may be any suitable continuous or discontinuous function. In embodiments in which the function for deriving an effective CQI value from an actual CQI value is dependent on the category of the device 103, each category of device may be associated with a corresponding function $f_{category\_n}$ ($CQI_{actual}$, a). Although the value of the function $f$ will generally tend to decrease as the age, a, of the actual CQI value increases, the skilled person will appreciate that, in certain exemplary embodiments, the function $f$ is not required to be a monotonically decreasing function, for example the function $f$ may be an increasing function in one or more sub-regions of its domain.

The base station 101 maintains a data structure (e.g. a table) for recording various values used in the techniques described herein. One example of a data structure used in embodiments of the present disclosure is illustrated in FIG. 2.

The data structure 200 includes an entry 201 (e.g. a row of the table) for each device 103 currently connected to the base station 101, where each entry 201 records the values of the corresponding device 103 (e.g. in respective columns of the table). For example, when a device 103 initially connects to the base station 101, the base station 101 may create an entry 201 corresponding to the newly connected device 103. Conversely, when a device 103 disconnects from the base station 101, the base station 101 may delete the entry 201 corresponding to the disconnected device 103. In certain embodiments, when a device 103 disconnects from the base station 101, the base station 101 may maintain the entry 201 corresponding to the disconnected device 103 for a predetermined time before deleting the entry 201, so that, if the device 103 reconnects to the same base station 101 within the threshold time, overhead in deleting and creating entries 201 of the data structure 200 may be reduced.

In certain exemplary embodiments, the base station 101 records the values indicated below in the data structure 200 for each device 103 currently connected to the base station 101. The skilled person will appreciate that, in some embodiments, not all of these values need to be recorded in the data structure 200. In addition, in some embodiments, one or more additional values may be recorded in the data structure 200.

The base station 101 receives a message from each device 103, including an identification of each device 103 and the category of each device 103. The base station 101 records the device identification of each device 103, for example in a first region (e.g. column) 203 of the data structure 200, and the category of each device 103, for example in a second region (e.g. column) 205 of the data structure 200.

The base station 101 receives actual CQI values from each device 103 connected thereto, and records the actual CQI values of each device 103 in the data structure 200. In some embodiments, only the most recent actual CQI value of each device 103 is recorded in the data structure 200, for example in a third region (e.g. column) 207 of the data structure 200. However, in other embodiments, one or more history values representing a history of previous actual CQI values for each device 103 may also be recorded in the data structure 200. The history values may comprise a list of previous actual CQI values, for example recorded in a fourth region (e.g. column) 209 of the data structure 200, and/or one or more statistical values (e.g. mean, median or mode) representative of previous actual CQI values, for example recorded in a fifth region (e.g. column) 211 of the data structure 200. A mode refers to the most commonly occurring value within a set of values, or the histogram bin containing the most values. The history values may be based on any suitable set of previous actual CQI values, for example all previous actual CQI values, the M most recent previous actual CQI values (M=1, 2, 3, . . . ), or previous actual CQI values falling within a certain time window. As described further below, the history values may be used to predict or estimate what a newly updated actual CQI of a device 103 would be, if requested.

The base station 101 may also record a time stamp representing the time at which the most recent actual CQI value was provided, for example in a sixth region (e.g. column) 213 of the data structure 200, and/or the age of the most recent actual CQI value, for example in a seventh region (e.g. column) 215 of the data structure 200.

The base station 101 computes effective CQI values based on corresponding actual CQI values received by the base station 101, and records the computed effective CQI values in the data structure, for example in an eighth region (e.g. column) 217 of the data structure. In certain embodiments, an effective CQI value corresponding to a most recent actual CQI value (only) is recorded in the data structure 200.

In addition to recording the values indicated above in the data structure 200, the base station 101 also updates the data structure 200 to reflect changes and updates to the values recorded therein, for example as indicated below.

When the base station 101 receives an actual CQI value (i.e. an updated actual CQI value) from a currently connected device 103, the base station 101 performs the following updates in the entry 201 corresponding to that device 103 in the data structure 200. The base station 101 adds the existing most recent actual CQI value to the history of previous actual CQI values, and updates the statistical values representing the history of previous actual CQI values. The base station 101 then updates the most recent actual CQI value by replacing the existing most recent actual CQI value with the newly received actual CQI value. The base station 101 also updates the time stamp of the most recent actual CQI value to the current time, updates the age of the most recent actual CQI value to zero, and updates the category of the most recent actual CQI value accordingly (e.g. to "Recent").

The base station 101 also computes an effective CQI value corresponding to the newly received actual CQI value, and updates the effective CQI value recorded in the data structure 200 by replacing the existing effective CQI value with the newly computed effective CQI value. In the case that the effective CQI value is determined based on Table 1, the effective CQI value will initially be the same as the newly received actual CQI value.

In addition to the updates described above, since effective CQI values decrease as a function of time, the base station 101 also updates the effective CQI values recorded in the data structure 200 to reflect changes in these values as time passes. The base station 101 also updates the ages and CQI categories of the most recent actual CQI values, to reflect changes in these values as time passes. The base station 101 may update these values recorded in the data structure 200 according to any suitable updating schedule, for example continuously or periodically.

As described above, the base station 101 maintains a data structure 200 for recording various values corresponding to devices 103 currently connected to the base station 101. In the case that there are multiple base stations, each base station maintains its own respective data structure, such that the data structure maintained by a particular base station records values corresponding to those devices connected to that particular base station.

Figure 3:
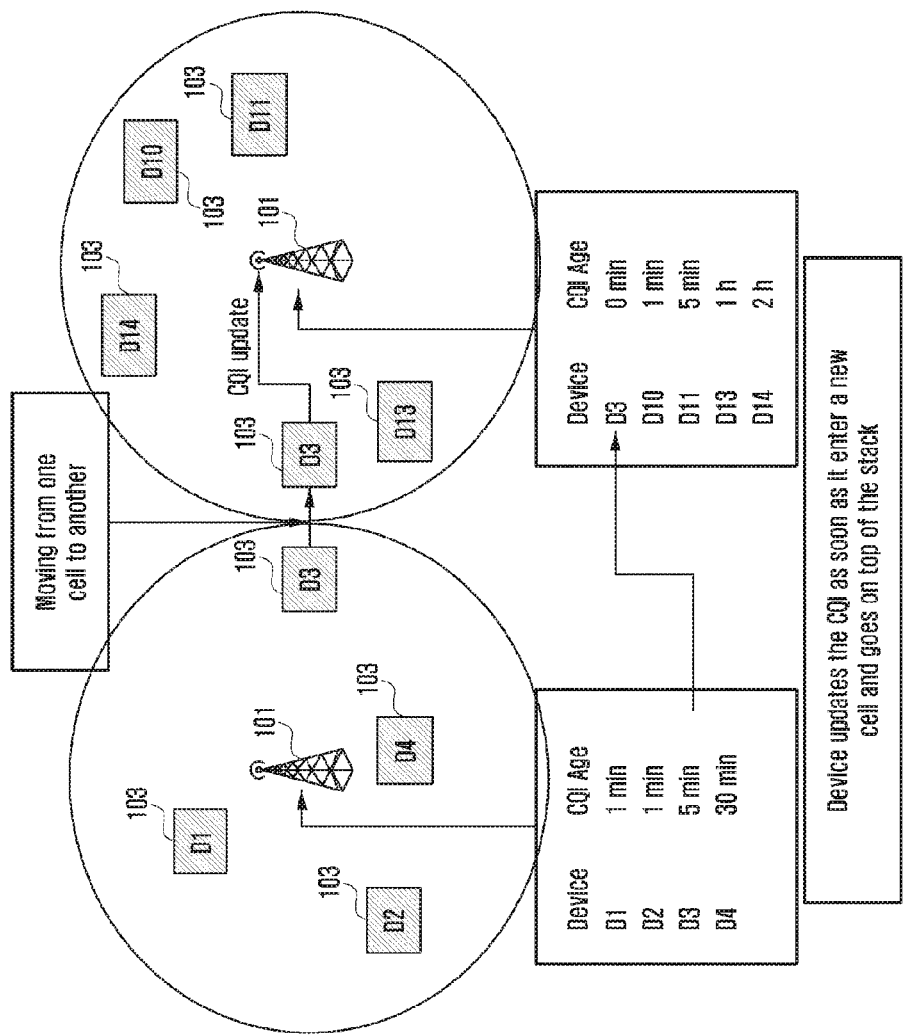
FIG. 3 illustrates an example of a network comprising two base stations.

FIG. 3 illustrates an example of a network comprising two base stations. Four devices, D1-D4, are initially located in a first cell of the first base station, and five devices, D10-D14, are initially located in a second cell of the second base station. FIG. 3 also illustrates two partial tables maintained by the first and second base stations, respectively, which record the devices currently connected to each base station, and the ages of the most recent actual CQI values of each device. The entries in each table are ordered by age of the most recent actual CQI value. FIG. 3 illustrates that when one of the devices, D3, moves from the first cell to the second cell, the first base station deletes the corresponding entry from the first table and the second base station creates a new corresponding entry in the second table. When device D3 enters the second cell, the device transmits an actual CQI value to the second base station, which becomes the newest actual CQI value among actual CQI values of devices currently connected to the second base station, and hence becomes the top entry in the second table.

Various techniques will now be described for selecting data transmission/reception parameters based on CQI values, and for selectively updating the CQI values.

As mentioned above, in embodiments of the present disclosure, one or more data transmission/reception parameters for performing data transmission/reception between a base station 101 and one or more devices 103 may be selected or determined based on the effective CQI values of the devices 103.

For example, in the case of a point-to-point transmission between the base station 101 and a single specific device 103, a data transmission rate (e.g. defined by a Modulation and Coding Scheme (MCS)) may be selected based on the effective CQI value of that device 103. In particular, the lower the effective CQI value is, the lower the data transmission rate should be.

In the case of a downlink multicast transmission, in which data (e.g. a downlink common long message) transmitted by the base station 101 is received by two or more devices 103 simultaneously, a data transmission rate may be selected based on the lowest effective CQI value among all devices 103 intended to receive the multicast transmission (i.e. recipient devices). In particular, the lower the lowest effective CQI value is, the lower the data transmission rate should be. Accordingly, when the base station 101 is required or scheduled to perform a downlink multicast transmission to a set of recipient devices 103, the base station 101 retrieves the effective CQI values of each recipient device 103 from the data structure 200 and determines the lowest effective CQI value among all recipient devices 103, for example by ordering the effective CQI values of the recipient devices 103. The base station 101 then selects a data transmission rate based on the lowest effective CQI value, and performs the downlink multicast transmission addressed to the set of recipient devices 103 according to the selected transmission rate.

Since the data transmission rate of a multicast transmission is selected based on the lowest effective CQI value among recipient devices 103, the time required to perform the transmission is limited by the lowest effective CQI value among recipient devices 103. In certain embodiments of the present disclosure, one or more techniques may be applied to increase the lowest effective CQI value among recipient devices 103, to thereby increase the data transmission rate, and hence to reduce the time required to perform the data transmission. In the following description, several such techniques will be described first, and then an algorithm in which these techniques may be applied will be described.

Figure 4:
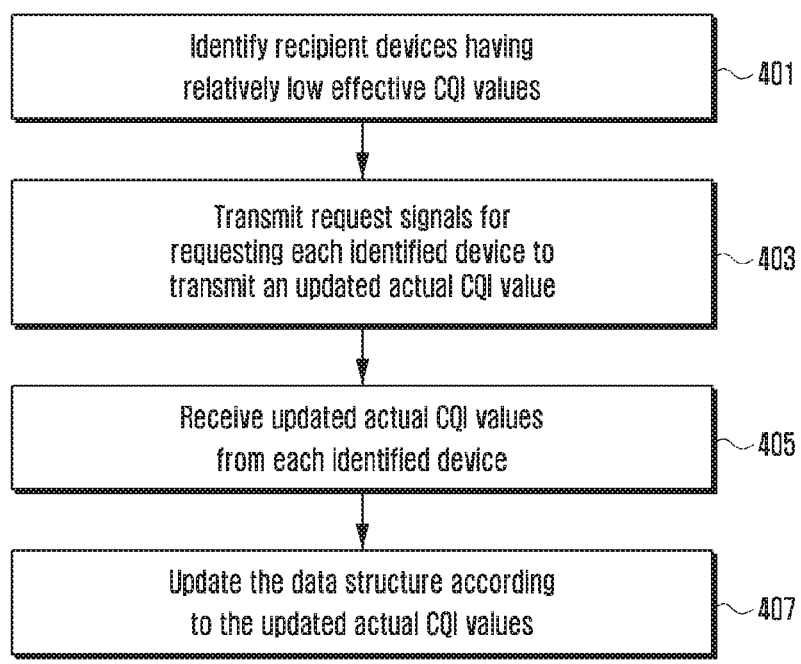
FIG. 4 is a flow diagram of a first technique for increasing the lowest effective CQI value among recipient devices of a multicast transmission.

In a first technique, illustrated in FIG. 4, the base station 101 identifies recipient devices 103 that have relatively low effective CQI values in step 401, and obtains updated actual CQI values from the identified devices 103 in steps 403 and 405, with the expectation that the effective CQI values of the identified devices 103 will be higher following the updating than before the updating.

The devices 103 identified by the base station 101 in step 401 may be devices 103 that have effective CQI values that are regarded as being too low to enable reliable transmission parameters to be selected. For example, the base station 101 may identify a first set of devices comprising all recipient devices 103 having current effective CQI values of –□ (i.e. all recipient devices 103 having actual CQI values categorized as "Obsolete"). Alternatively, the base station 101 may identify a first set of devices comprising all recipient devices having current effective CQI values lower than a certain threshold, where the threshold is set as the minimum effective CQI value that enables reliable transmission parameters to be selected.

The base station 101 then transmits a request signal to each of the identified first set of devices in step 403 requesting each of the first set of devices to transmit an updated actual CQI value to the base station 101. Alternatively, if the transmission is not urgent, then the base station 101 may (i) identify a second set of devices, comprising a subset of the first set of devices, that are scheduled to transmit an updated actual CQI value to the base station 101 within a threshold time (i.e. independent of any request by the base station 101), (ii) transmit a request signal to each of a third set of devices, comprising the first set of devices excluding the second set of devices, requesting each of the third set of devices to transmit an updated actual CQI value to the base station 101, (iii) wait for the second set of devices to transmit an updated actual CQI value to the base station 101 as scheduled, and (iv) if any of the second set of devices do not transmit an updated actual CQU value as scheduled, transmit a request signal to these devices.

As a result of the requests made by the base station 101 in step 403, the base station receives updated actual CQI values from each of the first set of devices in step 405. The base station 101 then updates relevant values recorded in the data structure 200 (e.g. most recent actual CQI values; times, ages and categories of the most recent actual CQI values; history values; and effective CQI values) in step 407 according to the updated actual CQI values received in step 405. By applying the first technique, obsolete actual CQI values (or other actual CQI values too low to enable reliable transmission parameters to be selected) may be eliminated, thereby allowing reliable transmission parameters to be selected.

As mentioned above, the data transmission rate for a downlink multicast transmission is selected based on the lowest effective CQI value among all recipient devices. Therefore, the data transmission rate may be increased (and hence the time required for performing the multicast transmission may be decreased) by increasing the lowest effective CQI value among the recipient devices. To achieve this, certain exemplary embodiments of the present disclosure may apply one or more of the following techniques.

In the following, the nth lowest effective CQI value (n=1, 2, 3, . . . ) among all recipient devices may be denoted $CQI_{min\_n}$. For example, the lowest effective CQI value among all recipient devices may be denoted $CQI_{min\_1}$, the next lowest effective CQI value among all recipient devices may be denoted $CQI_{min\_2}$, and so on. The recipient device having the nth lowest effective CQI value, $CQI_{min\_n}$, may be denoted $D_{min\_n}$. The expected effective CQI value of device $D_{min\_n}$ corresponding to a newly updated actual CQI value of device $D_{min\_n}$, if the update was to be requested, may be denoted $CQI'_{min\_n}$. A data transmission rate corresponding to an effective CQI value of $CQI_{min\_n}$ may be denoted $R_{min\_n}$ and a data transmission rate corresponding to an effective CQI value $CQI'_{min\_n}$ may be denoted $R'_{min\_n}$.

Figure 5A:
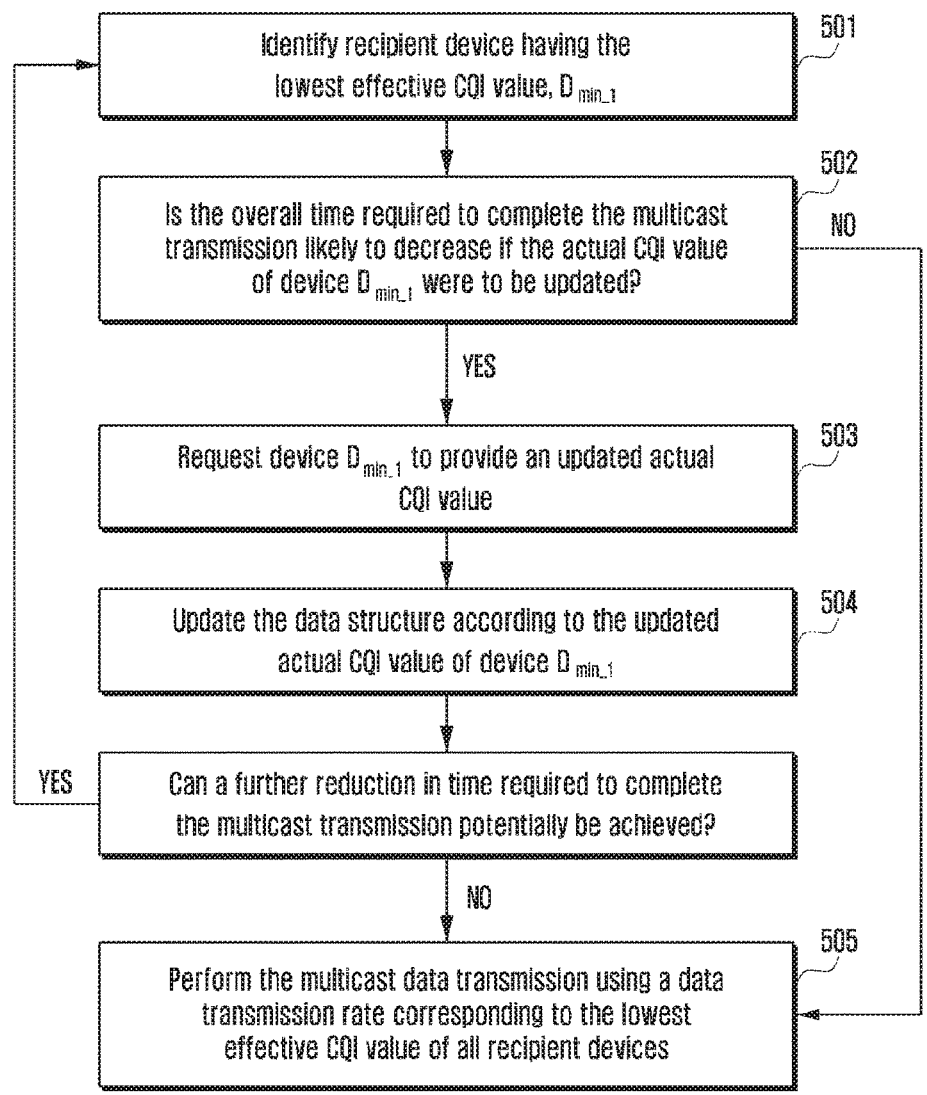
FIG. 5A is a flow diagram of a second technique for increasing the lowest effective CQI value among recipient devices of a multicast transmission.
Figure 5B:
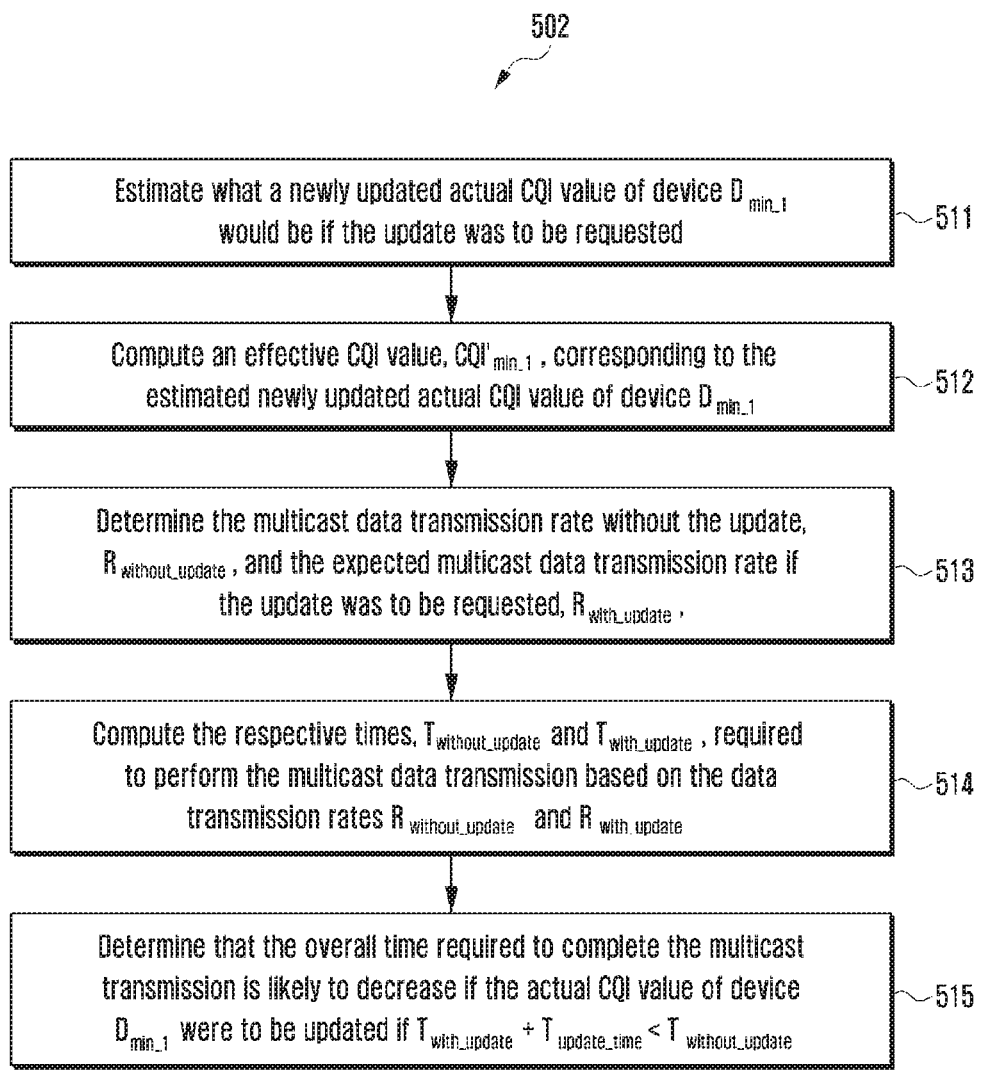
FIG. 5B is a flow diagram illustrating the second step of FIG. 5A in greater detail.

In a second technique, illustrated in FIG. 5A, in a first step 501, the base station 101 identifies device $D_{min\_1}$ as the device having the lowest effective CQI value, $CQI_{min\_1}$, among all recipient devices, for example by ordering the effective CQI values of the recipient devices. In a second step 502, the base station 101 determines whether or not the overall time required to complete the multicast transmission is likely to decrease if the actual CQI value of device $D_{min\_1}$ were to be updated. In a third step 503, if it is determined in the second step 502 that the overall time required to complete the multicast transmission is likely to decrease, then the base station 101 requests device $D_{min\_1}$ to provide an updated actual CQI value. Otherwise, the base station 101 does not request device $D_{min\_1}$ to provide an updated actual CQI value. In a fourth step 504, if an updated actual CQI value is provided by device $D_{min\_1}$, relevant values in the data structure 200 (e.g. the effective CQI value of device $D_{min\_1}$) are updated based on the newly updated actual CQI value of device $D_{min\_1}$.

The first to fourth steps 501-504 may be repeated (e.g. iteratively) until no further reduction in time required to complete the multicast transmission can (or can potentially) be achieved. For example, in certain embodiments, it may be determined that no further reduction in time required to complete the multicast transmission can be achieved using the second technique alone if (i) the effective CQI value of device $D_{min\_1}$ remains the lowest effective CQI value among all recipient devices after an updated actual CQI value is provided by device $D_{min\_1}$, or (ii) it is determined in step 502 that the overall time required to complete the multicast transmission is not likely to decrease if the actual CQI value of device $D_{min\_1}$ were to be updated. The base station 101 then performs the multicast data transmission in a fifth step 505 using a data transmission rate corresponding to the lowest effective CQI value of all recipient devices, including the updates performed in the first to fourth steps described above.

In the second step 502 described above, the following process, illustrated in FIG. 5B, may be used by the base station 101 to determine whether or not the overall time required to complete the multicast transmission is likely to decrease if the actual CQI value of device $D_{min\_1}$ were to be updated.

In a first step 511, the base station 101 estimates or predicts what a newly updated actual CQI value of device $D_{min\_1}$ would be, if the update was to be requested. For example, this value may be predicted or estimated based on the history values representing the history of previous actual CQI values for device $D_{min\_1}$ recorded in the data structure 200. For example, an average (e.g. mean) of previous actual CQI values of device $D_{min\_1}$ may be used as an estimate of the newly updated actual CQI value of device $D_{min\_1}$.

In a first step 511, the base station 101 estimates or predicts what a newly updated actual CQI value of device $D_{min\_1}$ would be, if the update was to be requested. For example, this value may be predicted or estimated based on the history values representing the history of previous actual CQI values for device $D_{min\_1}$ recorded in the data structure 200. For example, an average (e.g. mean) of previous actual CQI values of device $D_{min\_1}$ may be used as an estimate of the newly updated actual CQI value of device $D_{min\_1}$.

In a next step 513, the base station 101 determines the date transmission rate corresponding to the effective CQI value $CQI_{min\_1}$. The value $R_{min\_1}$ represents the multicast data transmission rate without the update, and may be denoted $R_{without\_update}$. The base station 101 also determines the date transmission rate $R'_{min\_1}$ corresponding to the effective CQI value $CQI'_{min\_1}$ and determines the data transmission rate $R_{min\_2}$ corresponding to the effective CQI value $CQI_{min\_2}$. Here, $CQI_{min\_2}$ represents the lowest effective CQI value among all recipient devices other than device $D_{min\_1}$. In certain exemplary embodiments, the effective CQI value $CQI_{min\_2}$ may be adjusted to take into account the time required to perform the update. For example after the time required to perform the update, the effective CQI value $CQI_{min\_2}$ may have decreased, or a different device may have the lowest effective CQI value among all recipient devices other than device $D_{min\_1}$ due to changes in effective CQI values of the recipient devices. The base station 101 then determines the lower of $R'_{min\_1}$ and $R_{min\_2}$. The lower of these two values represents an estimate of the multicast data transmission rate with the update, and may be denoted $R_{with\_update}$.

In a next step 514, the base station 101 computes the time required to perform the multicast data transmission based on the data transmission rate $R_{with\_update}$, denoted $T_{with\_update}$, and given by $T_{with\_update}=S/R_{with\_update}$, where S is the volume of data to be transmitted. The value $T_{with\_update}$ represents the time required to perform the multicast data transmission with the update. The base station 101 also computes the time required to perform the multicast data transmission based on the data transmission rate $R_{without\_update}$, denoted $T_{without\_update}$, and given by $T_{without\_update}=S/R_{without\_update}$. The value $T_{without\_update}$ represents the time required to perform the multicast data transmission without the update. If $T_{with\_update}$ is less than $T_{without\_update}$, then the multicast cast data transmission will take less time to perform with the update than without the update.

Although updating the actual CQI value of device $D_{min\_1}$ may achieve a higher data transmission rate, there is some time overhead associated with updating the actual CQI value of device $D_{min\_1}$, which may be denoted $T_{update\_time}$. The base station 101 may take this time overhead into account when determining whether or not to perform the update. Accordingly, in a next step 515, the base station determines whether or not the inequality $T_{with\_update}+T_{update\_time}<T_{without\_update}$ is satisfied. If the inequality is satisfied, the base station 101 determines that the overall time required to complete the multicast transmission is likely to decrease if the actual CQI value of device $D_{min\_1}$ were to be updated.

In the example described above, the base station 101 requests device $D_{min\_1}$ to provide an updated actual CQI value if $T_{with\_update}+T_{update\_time}<T_{without\_update}$. In other embodiments, one or more addition condition may need to be satisfied for the base station 101 to request device $D_{min\_1}$ to provide an updated actual CQI value. For example, in certain embodiments, the base station may determine the data transmission rate corresponding to the second lowest effective CQI value among all recipient devices $CQI_{min\_2}$ (optionally with an adjustment as described above), denoted $R_{min\_2}$, and computes the time required to perform the multicast data transmission based on the data transmission rate $R_{min\_2}$, denoted $T_{min\_2}$. The base station also computes the time required to perform the multicast data transmission based on the data transmission rate $R'_{min\_1}$, denoted $T'_{min\_1}$. The base station 101 request device $D_{min\_1}$ to provide an updated actual CQI value only if the additional inequality $T'_{min\_1} < T_{min\_2}$ is also satisfied.

In the second technique described above, updating of actual CQI values is performed iteratively one device 103 at a time. In certain other exemplary embodiments, updating of actual CQI values may be performed several devices 103 at a time. For example, the following modified process may be performed. In a first step, the k devices 103 having the k lowest effective CQI values (i.e. devices $D_{min\_1}$, $D_{min\_2}$ ... $D_{min\_k}$) are identified. In a second step, it is determined whether or not the overall time required to complete the multicast transmission is likely to decrease if the actual CQI values of each of the k identified devices $D_{min\_1}$, $D_{min\_2}$ ... $D_{min\_k}$ 103 were to be updated. This determination may be made using the technique described above (i.e. based on predicted or estimated actual CQI values). The first and second steps are repeated for increasing values of k, k=1, 2, 3, ..., until a value of k is reached (k=$k_{max}$+1) such that the overall time required to complete the multicast transmission is not likely to decrease if the actual CQI value of devices $D_{min\_1}$, $D_{min\_2}$ ... $D_{min\_k}$ 103 were to be updated. In a third step, the base station 101 requests each of $k_{max}$ devices $D_{min\_1}$, $D_{min\_2}$ ... $D_{min\_kmax}$ 103 to provide an updated actual CQI value. In a fourth step, relevant values in the data structure 200 are updated based on the newly updated actual CQI values. The first to fourth steps may be performed once, or may be repeated until no further reduction in time required to complete the multicast transmission can be achieved.

Figure 6:
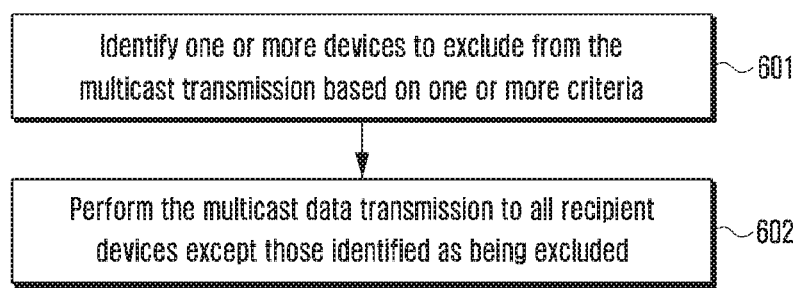
FIG. 6 is a flow diagram of a third technique for increasing the lowest effective CQI value among recipient devices of a multicast transmission.

In a third technique, illustrated in FIG. 6, the base station 101 determines whether one or more selected devices should be excluded from the multicast transmission, and should instead be dealt with separately (e.g. individually as a separate group). In a first step 601, the base station 101 identifies one or more devices 103 to exclude from the multicast transmission based on one or more criteria. In a second step 602, the base station 101 performs the multicast data transmission to all recipient devices 103 except those identified as being excluded in step 601. The multicast transmission is performed in step 602 using a data transmission rate corresponding to the lowest effective CQI value of all non-excluded recipient devices 103.

The selection of devices 103, if any, to exclude from the multicast transmission may be made based on various criteria. For example, in certain exemplary embodiments, one or more devices 103 may be excluded from a multicast transmission based on one or more of the following criteria.

According to a first criterion, if the effective CQI values of one or more recipient devices 103, either before updating or after updating, are below a certain threshold, then those devices 103 may be excluded from the multicast transmission. Here, the effective CQI value of a recipient device 103 after updating may refer to either a predicted or estimated effective CQI value (e.g. based on a history of previous actual CQI values), or an effective CQI value determined based on a newly updated actual CQI value.

According to a second criterion, if the time required to update the actual CQI values of one or more recipient devices 103 having the lowest effective CQI values exceeds a certain threshold, then those devices 103 may be excluded from the multicast transmission.

According to a third criterion, one or more devices 103 may be excluded from the multicast transmission based on the priority of the data transmission. For example, one or more recipient devices 103 having the lowest effective CQI values and for which the data transmission is relatively low priority (e.g. the data transmission is not required urgently, or the data to be transmitted is not essential) may be excluded from the multicast data transmission. For example, according to this technique, the overall data transmission may be divided into a first multicast transmission using a relatively high data rate for certain recipient devices 103 having relatively high effective CQI values, and a second (e.g. subsequent) multicast transmission using a relatively low data rate for the remaining recipient devices 103 (i.e. those excluded from the first multicast transmission) having relatively low effective CQI values and for which the data transmission is relatively low priority. Alternatively, the data transmission to the devices 103 excluded from the first multicast transmission may be deferred to a later time with the expectation that the available data transmission rate with respect to the excluded devices 103 will be higher at a later time (e.g. due to the actual CQI values of the excluded devices being updated in the meantime).

According to a fourth criterion, if the potential reduction in time required to perform the multicast data transmission (due to an increased data transmission rate) resulting from the exclusion of one or more devices 103 having the lowest effective CQI values is greater than the time overhead required to separately perform the data transmission to the excluded devices 103, then these devices 103 may be excluded from the multicast transmission. In this example, the base station 101 may identify the largest set of devices 103 that can be excluded in this manner while still achieving a potential reduction in time required to perform the multicast data transmission, and may exclude all (or only some) of the identified set of devices 103 from the multicast transmission.

If one or more devices 103 are excluded from a multicast transmission, the data transmission to the excluded devices may be dealt with separately (e.g. on a point-to-point basis and/or using a further (e.g. subsequent) multicast transmission).

Figure 7:
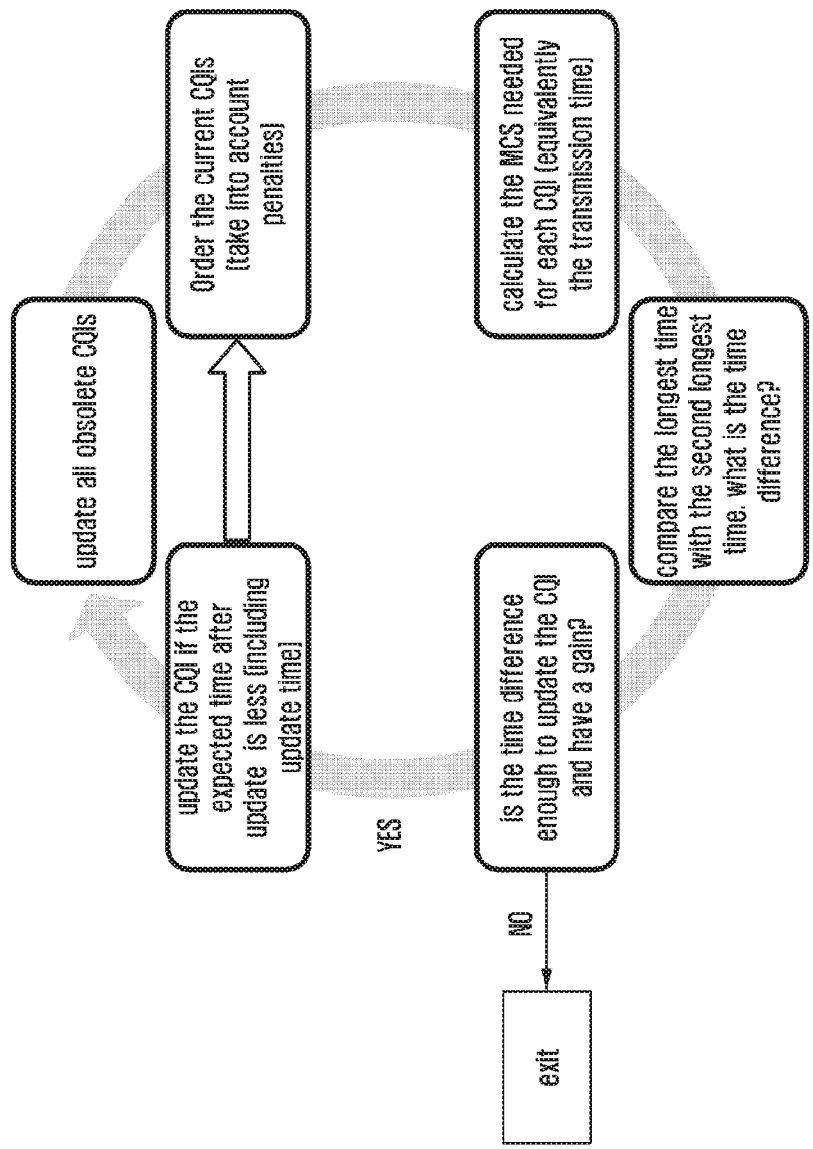
FIG. 7 illustrates the flow of an algorithm embodying the present disclosure.

The skilled person will appreciate that the first, second and third techniques described above may be used individually or in any suitable combination. An exemplary algorithm that includes the first, second and third techniques described above will now be described. The flow of the algorithm is illustrated in FIG. 7. The algorithm assumes that a data structure of the form described above is established by a base station, including values corresponding to a number of devices connected to the base station. The base station has a downlink common long message to transmit. The message will be transmitted in Multicast mode.

In a first step, obsolete CQIs are updated. For example, the base station sends a request to wake up devices from DRX (or wait if there is a scheduled CQI update and the transmission is not urgent). In response, the devices will provide updated corresponding CQIs. Following the first step, there are no "Obsolete" CQIs. All CQIs are either "Recent", or are "Out of date" such that an adjustment value is applied.

In a second step, based on the effective CQIs (including the adjustment values), the reliable transmission rate (e.g. Modulation and Coding scheme) is defined. Because of a multicast property the transmission rate needs to be based on the weakest (i.e. lowest) CQI. The actual transmission time is the time required with the current rate to deliver the message (longest time).

In a third step, based also on historical data, an average CQI or expected CQI is defined for each device. This average CQI gives an expected time of transmission.

In a fourth step, the times of transmissions (or equivalently effective CQI values) are ordered.

In a fifth step, if one device CQI is less than a threshold even after an update (or if the time needed to update the CQI exceeds a certain maximum time) then this device is discarded from the scheduling process. The update for this device may be done on a point to point basis, for example once the CQI is better.

In a sixth step, the maximum acceptable transmission time T1 is compared to the second maximum T2.

In a seventh step, based on historical data, an average (or best) expected CQI is stored for each device. The expected transmission time is also defined.

In an eighth step, if (the expected time T1 after update T1' is less than T2) and (T2+update time)<T1 then T1 is updated (by requesting the corresponding device to send an updated version of CQI).

The fourth to eighth steps are repeated until a recent (very reliable CQI) is the lowest CQI. In this case, there is no gain in improving other CQIs even if their expected value is higher.

In a ninth step, if the difference between the two times (T1 and T1' or T1 and T2) is small (less than what is required to update CQIs), the actual data rate will be used without requesting CQI update.

In a tenth step, once the CQIs with the best time saving (between actual and expected) are updated, the transmission with the new data rate is rescheduled.

As described above, if a base station plans a common downlink transmission (e.g. a software update) then it has to be based on the weakest link (i.e. lowest CQI). However, it may happen that the weakest link is obsolete and a CQI update can bring significant improvement in the CQI (of a moving car for example).

In one example, because of the Modulation and Coding scheme (MCS) choice (dependent on CQI), 35 minutes may be needed to transmit the update to all users. However, if the CQI is updated (which may takes 20 seconds), then the probability of having a better CQI is high. In this case, it is worth requesting an update.

Figure 8:
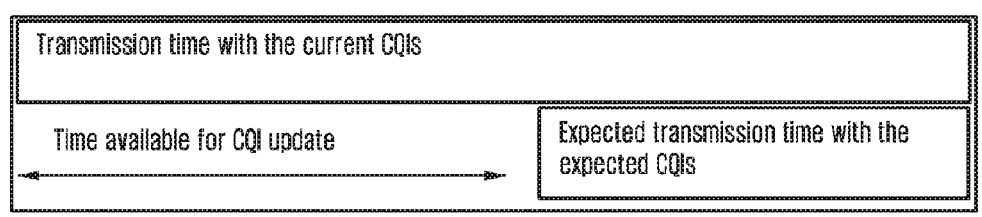
FIG. 8 schematically illustrates a difference between the transmission time needed if using current CQIs and the transmission time needed if using expected CQIs after updating in certain exemplary embodiments of the present disclosure.

FIG. 8 schematically illustrates a difference between the transmission time needed if using the current CQIs and the transmission time needed if using the expected CQI (after update). The available time for CQI update is the difference between the two times. The base station may request an update if the time needed for the update is less that the time available.

Figure 9:
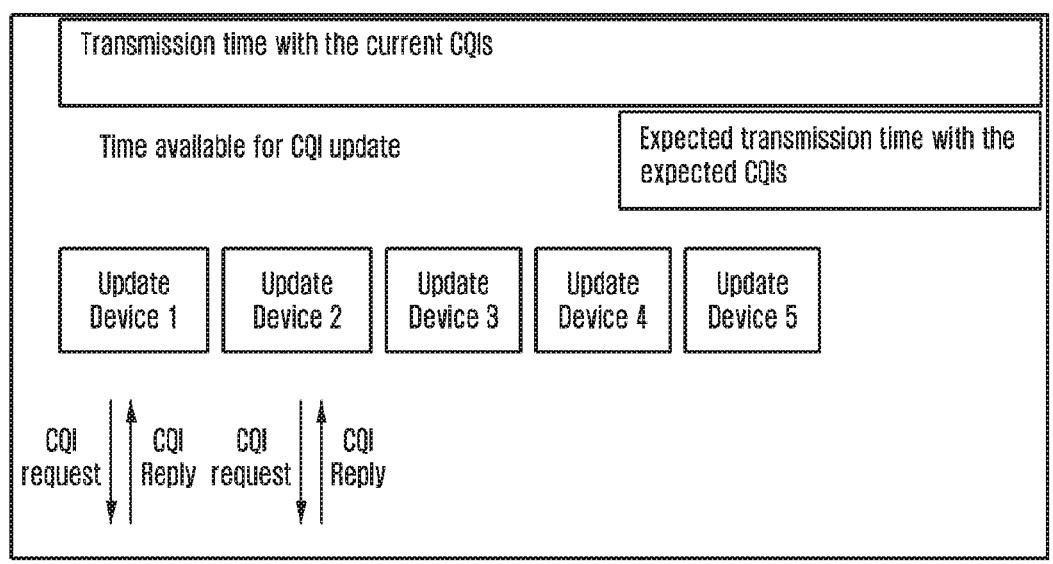
Figure 10:
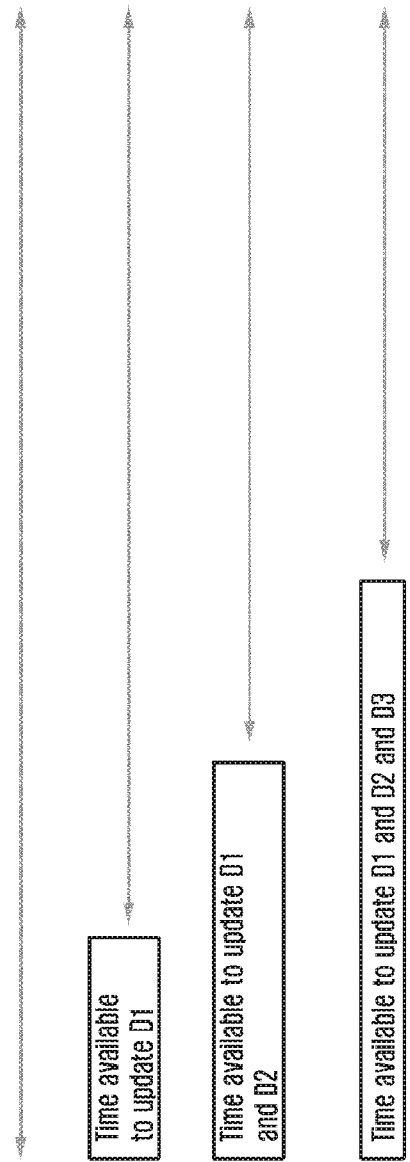

FIGS. 9 to 11 schematically illustrate the maximum number of devices that can be updated, the time available to update the devices, and the expected time to update the devices. The update may prioritize devices that have a low CQI and whose expected CQI is high, such that the update is expected to bring the biggest benefit. The update is not conducted if the expected CQI does not bring any benefit. In the example illustrated in FIG. 11, it is beneficial to update Device 1 because the expected CQI is higher (time low, green arrow) that the device 2 actual CQI. Thus if Device 1 is updated with the expected CQI it will allow to reduce the total transmission time. The same thing applies for Device 2. Device 3 is not worth updating however, because even if Device 3 is updated, it will still be the weakest (or other devices will be on the same level).

It will be appreciated that embodiments of the present disclosure can be realized in the form of hardware, software or a combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain embodiments of the present disclosure. Accordingly, certain embodiments provide a program comprising code for implementing a method, apparatus or system as claimed in any one of the claims of this specification, and a machine-readable storage storing such a program. Still further, such programs may be conveyed electronically via any medium, for example a communication signal carried over a wired or wireless connection, and embodiments suitably encompass the same.

While the disclosure has been shown and described with reference to certain embodiments thereof, it will be understood by those skilled in the art that various changes in form and detail may be made therein without departing from the scope of the disclosure, as defined by the appended claims. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a base station in a wireless communication system, the method comprising:
   receiving at least one of first channel quality indicator (CQI) values from a plurality of devices;
   determining at least one of second CQI values corresponding to the at least one of first CQI values for the plurality of devices by subtracting a value from each of the at least one of first CQI values, the value being proportional to an elapsed time that is measured between the reception of each of the at least one of first CQI values and the determination of each of the at least one of second CQI values;
   selecting at least one of data transmission parameters based on the at least one of second CQI values for each of the plurality of devices;
   identifying a first device having a lowest second CQI value among the plurality of devices;
   transmitting a first message for requesting an updated first CQI value to the first device; and
   receiving the updated first CQI value from the first device.

2. The method of claim 1, further comprising:
   generating data for the plurality of devices based on the at least one of first CQI values, the elapsed time for the plurality of devices and the at least one of second CQI values corresponding to the at least one of first CQI values;
   storing the generated data; and
   updating the stored data of a device when an updated first CQI value is received from the device.

3. The method of claim 2,
   wherein a second message for requesting an updated first CQI value is transmitted to the first device, when the lowest second CQI value is updated and a time required to complete a multicast data transmission decreases.

4. The method of claim 3, further comprising:
determining an updated second CQI value corresponding to the updated first CQI value based on the received updated first CQI value;
determining a first data transmission rate corresponding to the lowest second CQI value;
determining a second data transmission rate corresponding to the updated second CQI value; and
identifying a first transmission time for transmitting a multicast data based on the first data transmission rate, and a second transmission time for transmitting the multicast data based on the second data transmission rate,
wherein the time required to complete the multicast data transmission is determined to be decreasing, in case that the first transmission time is greater than a sum of the second transmission time and a time for updating the lowest second CQI value.

5. The method of claim 1, wherein the value is an infinite value when the elapsed time is over a threshold value.

6. A method by a terminal in a wireless communication system, the method comprising:
transmitting a first channel quality indicator (CQI) value to a base station;
receiving, from, the base station, a request message for requesting an updated first CQI value; and
transmitting the updated first CQI value to the base station,
wherein a second CQI value corresponding to the first CQI value is determined by subtracting a value from the first CQI value, the value being proportional to an elapsed time which is measured between the transmission of the first CQI value and the determination of the second CQI value,
wherein the request message is received when the terminal is identified to be a device having a lowest second CQI value among a plurality of devices, and
wherein a data transmission parameter is selected for the terminal based on the second CQI value.

7. The method of claim 6,
wherein the value is an infinite value when the elapsed time is over a threshold value.

8. A base station in a wireless communication system, the base station comprising:
a transceiver configured to transmit and receive a signal; and
a controller to coupled with the transceiver and configured to:
receive at least one of first channel quality indicator (CQI) values from a plurality of devices,
determine at least one of second CQI values corresponding to the at least one of first CQI values for the plurality of devices by subtracting a value from each of the at least one of first CQI values, the value being proportional to an elapsed time that is measured between the reception of each of the at least one of first CQI values and the determination of each of the at least one of second CQI values,
select at least one of data transmission parameters based on the at least one of second CQI values for each of the plurality of devices,
identify a first device having a lowest second CQI value among the plurality of devices,
transmit a first message for requesting an updated first CQI value to the first device, and
receive the updated first CQI value from the first device.

9. The base station of claim 8, wherein the controller is further configured to:
generate data for the plurality of devices based on the at least one of first CQI values, the elapsed time for the plurality of devices and the at least one of second CQI values corresponding to the at least one of first CQI values,
store the generated data information, and
update the stored data of a device when an updated first CQI value is received from the device.

10. The base station of claim 9,
wherein a second message for requesting an updated first CQI value is transmitted to the first device, when the lowest second CQI value is updated and a time required to complete a multicast data transmission decreases.

11. The base station of claim 10, wherein the controller is further configured to:
determine an updated second CQI value corresponding to the updated first CQI value based on the received updated first CQI value,
determine a first data transmission rate corresponding to the lowest second CQI value,
determine a second data transmission rate corresponding to the updated second CQI value, and
identify a first transmission time for transmitting a multicast data based on the first data transmission rate, and a second transmission time for transmitting the multicast data based on the second data transmission rate,
wherein the time required to complete the multicast data transmission is determined to be decreasing, in case that the first transmission time is greater than a sum of the second transmission time and a time for updating the lowest second CQI value.

12. The base station of claim 8, wherein the value is an infinite value when the elapsed time is over a threshold value.

13. A terminal in a wireless communication system, the terminal comprising:
a transceiver configured to transmit and receive a signal; and
a controller coupled with the transceiver and configured to:
transmit, to a base station, a first channel quality indicator (CQI) value,
receive, from the base station, a request message for requesting an updated first CQI value, and
transmit the updated first CQI value to the base station,
wherein a second CQI value corresponding to the first CQI value is determined by subtracting a value from the first CQI value, the value being proportional to an elapsed time which is measured between the transmission of the first CQI value and the determination of the second CQI value,
wherein the request message is received when the terminal is identified to be a device having a lowest second CQI value among a plurality of devices, and
wherein a data transmission parameter is selected for the terminal based on the second CQI value.

14. The terminal of claim 13,
wherein the value is an infinite value when the elapsed time is over a threshold value.

* * * * *